US009026587B2

(12) United States Patent
Johnston

(10) Patent No.: US 9,026,587 B2
(45) Date of Patent: May 5, 2015

(54) SYSTEM AND METHOD FOR INVOKING APPLICATION COMMANDS WITH WEB SERVICE CALLS

(71) Applicant: CA, Inc., Islandia, NY (US)

(72) Inventor: Eugene E. Johnston, Pittsburgh, PA (US)

(73) Assignee: CA, Inc., New York, NY (US)

( * ) Notice: Subject to any disclaimer, the term of this patent is extended or adjusted under 35 U.S.C. 154(b) by 118 days.

(21) Appl. No.: 13/648,877

(22) Filed: Oct. 10, 2012

(65) Prior Publication Data
US 2014/0101290 A1   Apr. 10, 2014

(51) Int. Cl.
*G06F 15/16* (2006.01)
*G06F 17/30* (2006.01)

(52) U.S. Cl.
CPC .... *G06F 17/30861* (2013.01); *G06F 17/30864* (2013.01); *G06F 17/30923* (2013.01)

(58) Field of Classification Search
CPC ......... H04L 67/16; H04L 67/02; H04L 67/42; G06F 17/30923
USPC ........................... 709/203, 217, 223, 224, 219
See application file for complete search history.

(56) References Cited

U.S. PATENT DOCUMENTS

| | | | |
|---|---|---|---|
| 6,961,735 B2 * | 11/2005 | Gargya et al. | 1/1 |
| 7,055,143 B2 * | 5/2006 | Ringseth et al. | 717/143 |
| 7,062,535 B1 * | 6/2006 | Stark et al. | 709/206 |
| 7,206,807 B2 * | 4/2007 | Cheenath | 709/203 |
| 7,289,989 B2 * | 10/2007 | Bou-Ghannam et al. | 1/1 |
| 7,529,833 B2 * | 5/2009 | Cai et al. | 709/225 |
| 7,571,447 B2 * | 8/2009 | Ally et al. | 719/330 |
| 7,580,975 B2 * | 8/2009 | Cheenath | 709/203 |
| 7,707,564 B2 * | 4/2010 | Marvin et al. | 717/140 |
| 7,761,533 B2 * | 7/2010 | Angelov | 709/217 |
| 7,805,485 B2 * | 9/2010 | Plewnia | 709/203 |
| 7,971,195 B2 * | 6/2011 | Ringseth et al. | 717/137 |
| 8,204,799 B1 * | 6/2012 | Murray et al. | 705/26.81 |
| 8,447,829 B1 * | 5/2013 | Geller et al. | 709/217 |
| 2007/0174420 A1 * | 7/2007 | Khusial et al. | 709/217 |
| 2008/0294536 A1 * | 11/2008 | Taylor et al. | 705/28 |
| 2013/0198613 A1 * | 8/2013 | Scoda | 715/239 |

* cited by examiner

*Primary Examiner* — Lashonda Jacobs
(74) *Attorney, Agent, or Firm* — Baker Botts L.L.P.

(57) ABSTRACT

A method for invoking an application command includes generating a web service request. The web service request includes an extensible markup language (XML) document in the body of the web service request. The XML document includes information indicating an application command. The method further includes transmitting the web service request to a server using a network communication protocol.

16 Claims, 4 Drawing Sheets

```
public RequestService()

// You can optionally substitute run-time data into an XML string.
    // To do this, you associate a pattern with a replacement string
    // and create an array of such substitutions.

410 ─ String xmlRequestDoc = YouReadXmlTemplateFromFile();

420 ─ ArrayList substArray = new ArrayList();
      Substitution sub = new Substitution();
      sub.pattern = "${ContactName}"; // any distinctive pattern will work
      sub.replacement = "Gene";
      substArray.add(sub);

430 ─ sub.pattern = "XXXMessageXXX"; // any distinctive pattern will work
      sub.replacement = "What a great software engineer!";
      substArray.add(sub);

440 ─ RequestService request = new RequestService();
      xmlRequestDoc = request.replacePatterns(xmlRequestDoc, substArray);

450 ─ StringHelper.SettableStringParm xmlReplyDoc =
              new StringHelper.SettableStringParm();

460 ─ int httpStatusCode = request.sendRequest(Action.POST,
              "http://YourApHost:8080/apwebsvc/notifications",
              "YourUserName", "YourPassword",
              xmlRequestDoc, xmlReplyDoc);

470 ─ // Check the httpStatusCode, and
      // process the XML reply document contained in xmlReplyDoc.strVal.
```

FIG. 4

SYSTEM AND METHOD FOR INVOKING APPLICATION COMMANDS WITH WEB SERVICE CALLS

BACKGROUND

The disclosure relates generally to invoking application commands, and more specifically, to invoking application commands with web service calls.

SUMMARY

According to one embodiment of the disclosure, a method for invoking an application command includes generating a web service request comprising an extensible markup language (XML) document in the body of the web service request, the XML document comprising information indicating an application command; and transmitting the web service request to a server using a network communication protocol.

According to another embodiment of the disclosure, a method for invoking an application command includes generating a web service request; transmitting the web service request to a server using a network communication protocol; and retrieving a web service response comprising an XML document in the body of the response.

According to another embodiment of the disclosure, a computer based system for invoking an application command includes one or more processors; and a memory comprising logic operable to generate a web service request comprising an XML document in the body of the web service request, the XML document comprising information indicating an application command; and transmit the web service request to a server using a network communication protocol.

According to another embodiment of the disclosure, a computer based system for invoking an application command includes one or more processors; and a memory comprising logic operable to generate a web service request; transmit the web service request to a server using a network communication protocol; and retrieve a web service response comprising an XML document as the body of the response.

Other objects, features, and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the objects, features, and advantages thereof, reference now is made to the following description taken in connection with the accompanying drawings.

FIG. 4 illustrates a code block demonstrating how to call the system for invoking an application command in FIG. 1.

DETAILED DESCRIPTION

Figure 1:
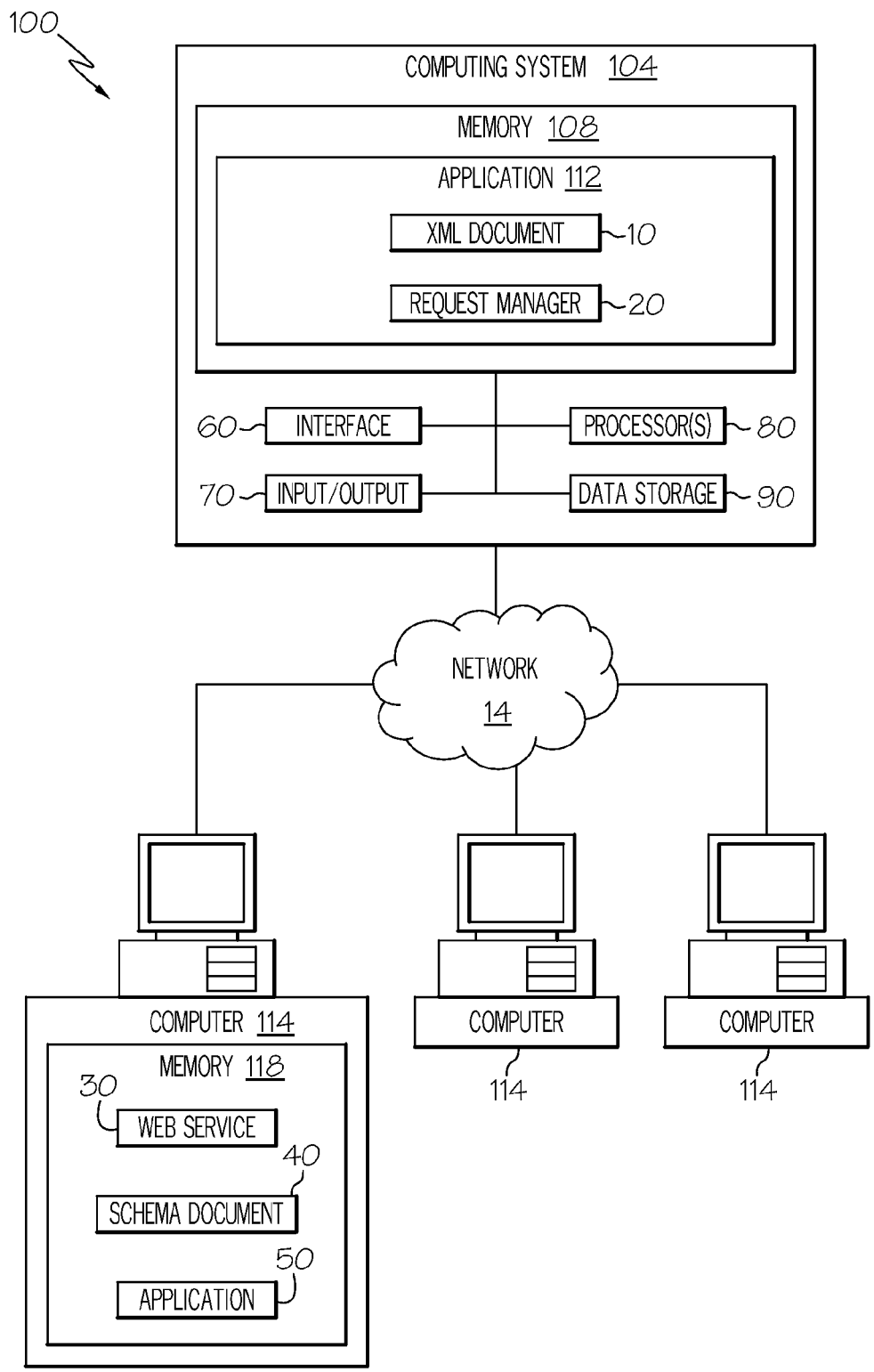
FIG. 1 illustrates a diagram of a system for invoking an application command in accordance with a particular configuration.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Service oriented architectures may enable application reuse by exposing service functionality across platforms via a network. Businesses may host applications on several computing platforms such as WINDOWS, UNIX, and LINUX. These platforms may not be compatible and may not be designed to allow access to applications running on a different platform. Developing web services that conform to the representational state transfer ("REST") architecture may ensure that those services may be accessed with standards based methods such as hypertext transfer protocol ("HTTP") methods. However, calling such services may require an in depth knowledge and understanding of HTTP. Application developers, generally, may specialize in high level applications and may not be familiar with the HTTP concepts required for conducting REST service communications.

An organization's inability to leverage service oriented architectures may produce inefficiencies. When businesses may host applications on incompatible platforms, users or applications running on one platform may not communicate with applications hosted on other platforms. A duplicate application may be deployed on each platform to ensure compatibility. Moreover, redundant applications may duplicate development and maintenance effort. An upgrade to one application may require development and deployment on multiple platforms. Such a configuration may waste resources and may produce maintenance inefficiencies.

This disclosure may allow a programmer with no knowledge of TCP/IP socket programming or Transport Layer Security programming to make web service requests, and invoke application commands. Methods of the disclosure may be used to substitute runtime data into a template XML document which may be read from disk. These methods may present a technical advantage by alleviating the programmer responsibility of forming an entire, grammatically correct, XML document within application logic. Simplifications to the programming effort embodied in the disclosure to send REST web service requests may increase customer adoption of web services provided by various software-as-a-service applications.

Referring to FIG. 1, a system 100 for invoking an application command may be implemented in one or more computers, e.g., one or more of a personal computer, a server, a mobile device, or the like. System 100 may comprise computers 104 and 114. Computers 104 and 114 may interact in system 100 such that computer 104 may invoke a command on an application 50 in computer 114.

Computer 104 may comprise a memory 108 running an application 112. Application 112 may generate a XML document 10. XML document 10 may include the command. In another embodiment, XML document 10 may include one or more of information indicating a recipient, a message, an inquiry for the recipient, and a response to be selected by the recipient. Application 112 may comprise a request manager 20. Request manager 20 may send a request to computer 114. Computer 114 may comprise a memory 118 running a web service 30. Web service 30 may store a schema document 40 and may receive the request. Web service 30 may parse XML document 10 for the command, using schema document 40, and may execute the command on an application 50. In another embodiment, web service 30 may parse XML document 10 for information that may include one or more of information indicating the recipient, the message, the inquiry for the recipient, and the response to be selected by the recipient, and may execute a notification command on application 50. The notification command may comprise information from XML document 10. Application 50 may send a notification to a recipient that may correspond to the recipient in XML document 10 when the notification command is executed on application 50. The notification may comprise a message that may correspond to the message to the recipient in XML document 10. The notification may further comprise an inquiry that may correspond to the inquiry in XML document 10. The notification may further comprise a response to be selected by the recipient that may correspond to the response to be selected by the recipient in XML document 10.

Figure 2:
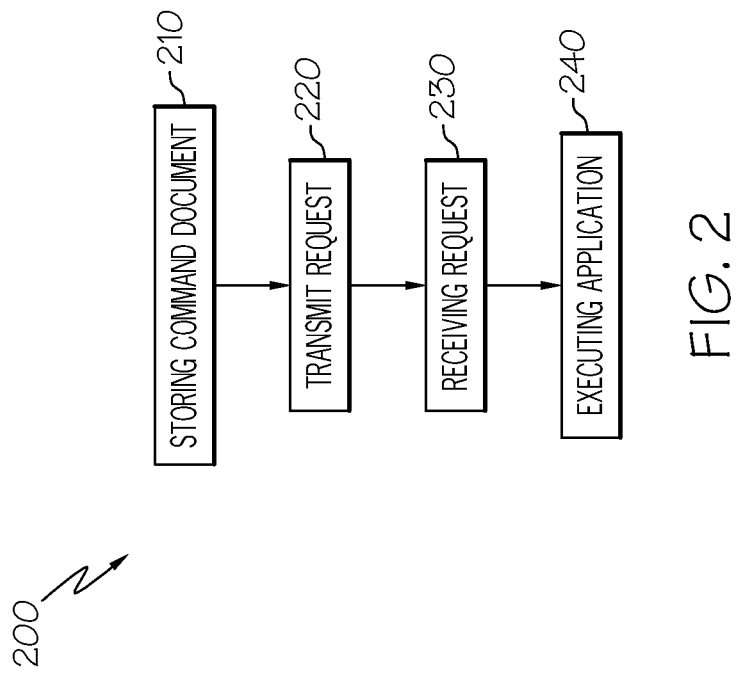
FIG. 2 illustrates a flowchart depicting a method for invoking an application command in accordance with a particular configuration.

FIG. 2 illustrates a flowchart depicting a method 200 for invoking an application command in accordance with a particular configuration. Method 200 may be implemented in a network comprising one or more computers, e.g., a personal computer, a server, a mobile device, or a system such as system 100 depicted in FIG. 1. A computer may execute method 200 to invoke an application command. In particular, the computer may invoke an application command on another computer connected to the network.

At step 210, a computer may generate XML document 10. A computer may run an application configured to make web service calls by calling API functions during execution. A computer may store XML document 10 in one or more of hard disk, and main memory during one or more of application runtime, installation, and function execution. The XML document may contain a command. The command may contain information indicating an application and information indicating a command to invoke. In another embodiment, XML document 10 may include one or more of information indicating a recipient, a message, an inquiry for the recipient, and a response to be selected by the recipient.

The command may comprise information indicating application 50, and information indicating the command to be executed on application 50. Web service 30 may parse the command information from XML document 10, and may search memory 118 for processes that may match the information indicating application 50. In another embodiment, the command may comprise a combination of one or more of application names, parameters, arguments and constraints. In still other embodiments, XML document 10 may include, for example, one or more of information indicating a recipient, a message, an inquiry for the recipient, and a response to be selected by the recipient.

XML document 10 may be stored in data storage 90, and may be loaded into memory 108 by application 112. In another embodiment, application 112 may create XML document 10 and may store it in memory 108. Application 112 may generate XML document 10. In another embodiment, different applications may generate XML document 10, or XML document 10 may be generated during application 112 installation.

At step 220, the computer referred to in step 210 may transmit a request through a network using request manager 20. The request may be an HTTP request, and may include one or more of a URI, a query string, and a plurality of HTTP header fields. The query string parameters may comprise one or more of a user name, password, and HTTP method. Other parameters may be included in the query string without departing from the scope of the disclosure. The XML document may be embedded in the query string. In another embodiment, the XML document may be embedded in the body of the HTTP POST request.

Request manager 20 may receive parameters from application 112. The parameters may include one or more of a uniform resource identifier (URI), a hyper-text transfer protocol (HTTP) method, a user name, a password and XML document 10. The URI may comprise an internet protocol (IP) address of computer 114, a port number indicating a port on computer 114 and a path indicating a path in the web server directory structure of computer 114 that may correspond to web service 30. In another embodiment, the URI may comprise a domain name of computer 114 and a path to web service 30. The domain name may be resolved to the IP address of computer 114 by a domain name server. The HTTP method may indicate the action to be performed on the resource specified by the URI. The HTTP method may include HEAD, GET, POST, OPTIONS, or any other HTTP method for which web service 30 is configured to act on. The user name may be associated with a user running application 112. The user name may be a network service user, a generic web user, or any other user that may be authorized to access web service 30. The password maybe encrypted in application 112, decrypted in web service 30 and may be used to authenticate the request. The password may be encrypted and decrypted using a public shared key or any other encryption/decryption algorithm. In another embodiment, the password may not be encrypted.

Request manager 20 may create a request using the parameters of the command. The request may be an HTTP request that may be sent to the URI. Request manager 20 may modify the URI to include query string parameters. The query string parameters may comprise one or more of the user name, password, and HTTP method. Other parameters may be included in the query string without departing from the scope of the disclosure. Request manager 20 may include parameters in an HTTP header field or body. For example, request manager 20 may include XML document 10 in the HTTP request body when the request is using the POST HTTP method. HTTP header fields may include complex character strings.

A URI may represent a resource upon which operations are performed. The meaning of an HTTP method may be determined by the specified URI. For example, the base name of a URI targeted to a web service running under an application server on a local machine may be: https://localhost:8443/apwebsvc. A specific host name may be used by a client application running on another computer. Further, a site may choose to configure an application server to use a non-default port number. The remainder of the URI may reflect the resource of interest.

A URI may contain a query string that may contain non-hierarchical data that, along with data in the path component, may serve to identify a resource within the scope of the URI's scheme and naming authority. Request manager 20 may modify the URI to include the parameters in the query component of the URI, such that the URI may pass parameters from resource manager 20 to web service 30. The query component may be indicated by the first question mark ('?') character and may be terminated by a number sign ('#') character or by the end of the URI. Query components may be used to carry identifying information in the form of "key=value" pairs.

The URI may have multiple query options separated with an ampersand character ('&') character as in the following example: URI-path?option1=value&option2=value2. When an unknown query option is specified, the operation may return an HTTP status error of 400 (Bad Request). If an otherwise valid query option is specified, which is not applicable due to a conflict with another query option, the non-applicable option may be ignored and the operation may be processed.

Within some query strings, a pattern-matching expression may be used as the value of a query option. Examples of the pattern-matching expression format that web service 30 may

| Character | Meaning |
| --- | --- |
| . | Matches any one character |
| * | Matches any zero or more characters |

The '\' character may serve as an escape character. The following escape sequences may be recognized:

| Character Sequence | Meaning |
| --- | --- |
| \. | Matches the '.' character |
| \* | Matches the '*' character |
| \\ | Matches the '\' character |

Any other escape sequence may be treated as an error. For example, the string "AX\C" may be an invalid pattern.

Request manager 20 may comprise one or a plurality of code objects, and may be instantiated and referenced by other code objects associated with application 112 or any other application running on computer 104. Code objects may communicate with request manager 20 through an application programming interface (API). The API may allow access to functions of request manager 20.

In a particular embodiment, the API may be a web service JAVA® client API that may be used to make web service requests of a server. The web service API may be a RESTful interface that may use the HTTP protocol to specify the web service object of interest through a URI string, and request that an action be performed against that URI. The HTTP request-response protocol may be implemented within an application in order to send HTTP operations to a web service listener. The purpose of the JAVA® API may be to abstract the HTTP protocol.

When using this JAVA® API, the JAVA® programming responsibility may consist of:

1. Form a URI string that represents a desired web service 30 resource.
2. Identify the action to take on that resource.
3. Specify a user name and password that is authorized to perform the desired action.
4. If required by the action, form a string containing an XML document that provides all of the properties associated with the action.
5. Construct a com.ca.distauto.ap.websvc.client.RequestService object.
6. Call the RequestService.sendRequest method.
7. Check the returned HTTP status code value.
8. Process the returned XML reply document.

The JAVA® API may be bundled with a RequestService client. The JAVA® API may be deployed onto a remote computer.

Most of the web service actions may require an XML request document and may return an XML response document. XML schemas that may define the formats of all of these documents may be contained in a directory. For example, schema documents 40 may be stored in the 'InstallationDirectory\distrib\websvc' directory.

In a particular embodiment, the API may comprise a RequestService class that may perform web service requests for programs that may have no knowledge of web service protocols. The class may contain the functionality of request manager 20. The RequestService class may perform requests of REST web services, and may communicate XML documents with a web service using the HTTP protocol in a REST approach. The calling code may not know most of the REST communication details. The request manager object may further send a REST request to a URI using the XML document as the body of the request. The RequestService class may contain the three methods detailed below:

static void main(java.lang.String[ ] cmdLineArgs)

The main program may be run from the command line to make a request of a RESTful web service-enabled server program.

java.lang.String replacePatterns(java.lang.String, textWithPatterns,
        java.util.ArrayList<RequestService.Substitution> substitutions)

This method will replace a set of patterns with corresponding replacements within textWithPatterns.

int sendRequest(RequestService.Action action, java.lang.String resourceUriStr,
        java.lang.String userName, java.lang.String password,
        java.lang.String xmlRequestDoc, StringHelper.SettableStringParm xmlReplyDoc)

This method may send a RESTful request to the specified resource URI using the specified XML document as the body of the request.

The RequestService class may contain a sendRequest method that may send REST requests to a specified URI using a specified XML document as the body of the request. The signature for the sendRequest method may be described below:

public int sendRequest(RequestService.Action action,
        java.lang.String resourceUriStr,
        java.lang.String userName,
        java.lang.String password,
        java.lang.String xmlRequestDoc,
        StringHelper. SettableStringParm xmlReplyDoc)

The sendRequest method may accept parameters that may include an action, a resource URI, a user name, a password, a XML document, and a reply document. The action may specify the HTTP method to be performed against the specified URI. The resource URI may represent the desired service resource. Any spaces in the URI may automatically be converted to the HTTP URI encoding convention. The user name may specify a user name with privileges to act on the desired resource. The password may specify the password for the specified user name. The XML document may contain the request information. The XML document parameter may be null for a request that does not take a XML document. The XML document parameter may be supplied with XML document 10. The reply document may be an XML document that may contain the reply from the web service request. Not every request may deliver a reply document upon success. Some service requests may return an HTTP status code. The sendRequest method may return an HTTP status code that may represent the success or failure of the request. Values less than 300 may represent a success. Any other value may represent a failure.

The RequestService class may contain a replacePatterns method that may replace a set of patterns with corresponding replacements within textWithPatterns. Each pattern may be a simple text string (no regular expression pattern matching). The intended use of this method may be to replace multiple place-holders within XML template text with values determined at runtime. The signature for the replacePatterns method may be described below:

public java.lang.String replacePatterns(java.lang.String textWithPatterns,
    java.util.ArrayList<RequestService.Substitution> substitutions)

The replacePatterns method may accept parameters that may include the text for which the pattern replacement will be performed, and an array containing pairs of patterns and replacements.

The RequestService class may contain a main method that may be run from the command line to make a request of a RESTful web service-enabled server program. This application may accept parameters from the command line needed to communicate to the server application. This program may understand the web service protocols needed to communicate XML documents with a web service. It may be intended to enable scripts, which may have no knowledge of web service protocols, to make web service requests. The method signature may be described below:

public static void main(java.lang.String[ ] cmdLineArgs)

In a particular embodiment, the API may utilize a REST architecture. Thus, the API may perform various operations by issuing the HTTP methods GET, PUT, POST, and OPTIONS against a well-defined hierarchy of URIs that represent web service 30 objects. These URIs may be like the URIs that may be typed into a browser. Web service 30 URIs may be specific to a given server. These URIs may be accessible to that portion of a corporate network that can access the server.

A set of URIs that may represent meaningful web service objects may be defined and manipulated. The HTTP methods that may be issued against a given URI may be defined. The operations each method may perform against the related web service object may also be defined.

REST HTTP operations may include an attached XML payload that may contain parameters that may be associated with the desired operation. Similarly, the replies that may be received and the error results may be delivered in reply documents. The reply document may be parsed to process detailed results from the request, and may be formatted in XML. Different command and reply documents may apply to each specific HTTP method, issued against each web service 30 URI.

At step 230, web service 30 may receive the request, and may authenticate the request. If the request is authenticated successfully, web service 30 may parse request body for the XML document. In another embodiment, web service 30 may parse the query string for the XML document. Web service 30 may use the schema document to retrieve information from the XML document. In another embodiment, the schema document may be used to de-serialize the XML document into a code object that web service 30 may understand.

Computer 114 may execute web service 30 and a web server in memory 118. The web server may be configured to listen to traffic on an open port, and may forward requests to web service 30. Web service 30 may comprise application code configured to receive requests and execute application commands based on those requests. Web service 30 may comprise one or a plurality of code objects, and may be instantiated and referenced by other code objects running on computer 114. Code objects may communicate with web service 30 through an API. The API may allow access to functions of web service 30.

Web service 30 may receive the request from request manager 20. The request may be an HTTP request, which may trigger execution of logic in web service 30. Web service 30 may parse the request for parameters that may include the user name, the password, and XML document 10, and may authenticate the request based on one or more of the parameters. Web service 30 may decrypt the password using a public shared key or any other encryption/decryption algorithm. If the request is not authorized, web service 30 may return a response indicating that an error occurred.

Schema document 40 may define an XML schema and may be an extensible markup language schema document (XSD). Schema document 40 may be stored in data storage on computer 114, and may be stored in memory 118 by web service 30. In another embodiment, web service may create schema document 40 and may store it in memory 118. Web service 30 may store schema document 40. In another embodiment, different applications may store schema document 40, or schema document 40 may be stored during web service 30 installation. In another embodiment, web service 30 may de-serialize XML document 10 into a code object based on schema document 40.

Web service 30 may parse information from XML document 10 based on schema document 40. In certain embodiments, schema document 40 may be an XSD and XML document 10 may have XML formatting. In those embodiments, XML document 10 may correspond to schema document 40. If XML document 10 does not conform to schema document 40, web service 30 may return an error message to request manager 20.

The information contained in XML document 10 may include a command. The command may comprise information indicating application 50, and information indicating a command to run on application 50. Web service 30 may parse the command information from XML document 10 based on schema document 40, and may search memory 118 for a process that may correspond to the information indicating application 50. In another embodiment, the command may comprise a combination of one or more of application names, parameters, arguments and constraints. For example, the command may comprise the name of a notification application, the name of a send notification command, and the name of a group of recipients. Upon receiving the request, web service 30 may invoke the send notification command on the notification application with the name of the group of recipients. The notification application may then send a notification to each recipient in the group of recipients.

In still other embodiments, XML document 10 may include one or more of information indicating a recipient, a message, an inquiry for the recipient, and a response to be selected by the recipient. Web service 30 may search memory 118 for a notification application, and may execute a notification command. The notification command may comprise information from XML document 10 and may send a notification to a recipient that may correspond to the recipient in XML document 10. The notification may comprise a message that may correspond to the message to the recipient in XML document 10. The notification may further comprise an inquiry that may correspond to the inquiry in XML document 10. The notification may further comprise a response to be selected by the recipient that may correspond to the response to be selected by the recipient in XML document 10.

Web service 30 may execute any application running in memory 118 based on the parameters contained in XML document 10, and may return a return document indicating return information.

For example, web service 30 may comprise a URI that exposes functionality to request notifications, such as: https://localhost:8443/apwebsvc/notifications. This URI may represent the notifications that may have been processed by a notification manager. Sending a request with the GET HTTP method specifying the above URI may return a return document comprising a list of notifications in order from the oldest notification to the latest notification. HTTP query strings may be added to the URI to control the volume and order of returned URIs. Most query options may represent properties of the object that are returned in the reply document. For example, specifying a query string with "AnswerableBy=" may return a return document comprising a contact name that may be allowed to answer the notification. In another example, specifying a query string with "IssuedBy=" may return a return document comprising a name of a login that may have issued the notification. A sample URI using the GET HTTP method to return a return document comprising a list of 10 notifications occurring after the last result returned from the last web service call may resemble the following URI: https://192.168.1.5:8443/apwebsvc/notifications?AfterId=LastIdOfOurPreviousGet&Count=10. In this example, no XML document 10 may be sent.

In another example, the POST HTTP method may be specified in a request to send a notification. A XML document may contain characteristics of the notification, such as who may be notified and what the message may be. The XML document may correspond to a schema document. A user name and password may be sent in the HTTP headers of the request. The reply may contain response HTTP headers. A status HTTP header value of 202 may indicate that the request was successful. The reply may also contain a reply document that may contain the URI which may identify the created notification. The URI may also be returned in the HTTP location header.

The following is an example of XML document 10 from system 100 that may be sent in an HTTP POST request:

```xml
<?xml version="1.0" encoding="utf-8"?>
<NotificationRequest xmlns:xsi="http://www.w3.org/2001/XMLSchema-instance"
                xsi:schemaLocation="http://www.ca.com/distauto/ap/websvc/msgData apNotify.xsd"
                xmlns="http://www.ca.com/distauto/ap/websvc/msgData"
                Debug="yes" FailureRexx="ReportError.rex">
    <Name>Mr. Jones</Name>
    <Tell>Howdy Pardner</Tell>
    <Ask>
        <Question>How are you?</Question>
        <Choice>
            <Answer>I am fine</Answer>
        </Choice>
        <Choice>
            <Answer>Life stinks</Answer>
            <Action>CheerMeUp.rex</Action>
        </Choice>
        <EscalateWaitSec>30</EscalateWaitSec>
    </Ask>
    <MethTypesToUse>EVP</MethTypesToUse>
    <AcknowledgeAP>
        <Message>We acknowledge to AP that we did our job.</Message>
    </AcknowledgeAP>
    <AcknowledgeOPS>
        <Message>We acknowledge to OPS that we did our job.</Message>
        <Hostname>OpsHostName</Hostname>
    </AcknowledgeOPS>
    <AcknowledgeNSM>
        <Message>We acknowledge to NSM that we did our job.</Message>
        <Hostname>NsmHostName</Hostname>
    </AcknowledgeNSM>
    <Attachment>c:\someDir\emailAttachment.txt</Attachment>
    <MethParmOverride>
        <ParmName>SubjectText</ParmName>
        <ParmValue>email notification from AP</ParmValue>
    </MethParmOverride>
    <MethParmOverride>
        <ParmName>cc</ParmName>
        <ParmValue>Mr. Smith</ParmValue>
    </MethParmOverride>
</NotificationRequest>
```

Element and attribute values of the above example may contain descriptive text. Actual XML document 10 implementation may replace such descriptive text with useful values. The following may be an example of schema document 40 corresponding to XML document 10:

```xml
<xs:element name="NotificationRequest">
    <xs:complexType>
        <xs:sequence>
            <xs:element name="Name" type=" xs:string " minOccurs="1" maxOccurs="1"/>
            <xs:element name="Tell" type=" xs:string " minOccurs="1" maxOccurs="1"/>
            <xs:element name="Ask" minOccurs="0" maxOccurs="1">
                <xs:complexType>
                    <xs:sequence>
                        <xs:element name="Question" type=" xs:string " minOccurs="1"
                            maxOccurs="1"/>
                        <xs:element name="Choice" minOccurs="0" maxOccurs="9">
                            <xs:complexType>
                                <xs:sequence>
                                    <xs:element name="Answer" type=" xs:string " minOccurs="1"
                                        maxOccurs="1"/>
                                    <xs:element name="Action" type=" xs:string " minOccurs="0"
                                            maxOccurs="1"/>
                                </xs:sequence>
                            </xs:complexType>
                        </xs:element>
                        <xs:element name="EscalateWaitSec" minOccurs="0" maxOccurs="1">
                            <xs:simpleType>
                                <xs:restriction base=" xs:positiveInteger ">
                                    <xs:minInclusive value="1"/>
                                    <xs:maxInclusive value="3600"/>
                                </xs:restriction>
                            </xs:simpleType>
                        </xs:element>
                    </xs:sequence>
```

```
                </xs:complexType>
            </xs:element>
            <xs:element name="MethTypesToUse" minOccurs="0" maxOccurs="1"/>
                <xs:simpleType>
                    <xs:restriction base=" xs:string ">
                        <xs:pattern value="A|[B-W]+"/>
                    </xs:restriction>
                </xs:simpleType>
            </xs:element>
            <xs:element name="AcknowledgeAP" minOccurs="0" maxOccurs="1">
                <xs:complexType>
                    <xs:sequence>
                        <xs:element name="Message" type=" xs:string " minOccurs="1"
                                            maxOccurs="1"/>
                    </xs:sequence>
                </xs:complexType>
            </xs:element>
            <xs:element name="AcknowledgeOPS" minOccurs="0" maxOccurs="1">
                <xs:complexType>
                    <xs:sequence>
                        <xs:element name="Message" type=" xs:string " minOccurs="1"
                                            maxOccurs="1"/>
                        <xs:element name="Hostname" type=" xs:string " minOccurs="1"
                                            maxOccurs="1"/">
                    </xs:sequence>
                </xs:complexType>
            </xs:element>
            <xs:element name="AcknowledgeNSM" minOccurs="0" maxOccurs="1">
                <xs:complexType>
                    <xs:sequence>
                        <xs:element name="Message" type=" xs:string " minOccurs="1"
                                            maxOccurs="1"/>
                        <xs:element name="Hostname" type=" xs:string " minOccurs="0"
                                            maxOccurs="1"/>
                    </xs:sequence>
                </xs:complexType>
            </xs:element>
            <xs:element name="Attachment" minOccurs="0" maxOccurs="1">
                <xs:simpleType>
                    <xs:restriction base=" xs:string ">
                        <xs:whiteSpace value="preserve"/>
                        <xs:maxLength value="512"/>
                    </xs:restriction>
                </xs:simpleType>
            </xs:element>
            <xs:element name="MethParmOverride" minOccurs="0"
                                            maxOccurs="unbounded">
                <xs:complexType>
                    <xs:sequence>
                        <xs:element name="ParmName" minOccurs="1" maxOccurs="1">
                            <xs:simpleType>
                                <xs:restriction base=" xs:string ">
                                    <xs:whiteSpace value="collapse"/>
                                </xs:restriction>
                            </xs:simpleType>
                        </xs:element>
                        <xs:element name="ParmValue" minOccurs="1" maxOccurs="1">
                            <xs:simpleType>
                                <xs:restriction base=" xs:string ">
                                    <xs:whiteSpace value="preserve"/>
                                </xs:restriction>
                            </xs:simpletype>
                        </xs:element>
                    </xs:sequence>
                </xs:complexType>
            </xs:element>
        </xs:sequence>
        <xs:attribute name="Debug">
            <xs:simpleType>
                <xs:restriction base=" xs:string ">
                    <xs:enumeration value="yes"/>
                    <xs:enumeration value="no"/>
                </xs:restriction>
            </xs:simpleType>
        </xs:attribute>
        <xs:attribute name="FailureRexx">
            <xs:simpleType>
                <xs:restriction base=" xs:string ">
                    <xs:whiteSpace value="preserve"/>
```

```
            <xs:maxLength value="512"/>
          </xs:restriction>
        </xs:simpleType>
      </xs:attribute>
    </xs:complexType>
  </xs:element>
```

XML document 10 may be sent to computer 114 to request sending of a notification. The following optional attributes may be supplied for the 'NotificationRequest' element:

Attribute "Debug" may specify whether debugging messages is to be generated. The possible values for "Debug" are listed below. The 'Debug' attribute may be optional. If the "Debug" attribute is not supplied, the default value may be "no."

yes=Generate debugging messages
no=Do not generate debugging messages

Attribute "FailureRexx" may specify the name of a REXX program to run when every possible notification action has failed. A "FailureRexx" attribute may be optional. The "FailureRexx" file may be accessible from the server that is issuing the notification. The REXX program name may contain the associated file extension (.REX or .CMD). The full path to this REXX file may be omitted if the REXX program resides in either the web service 30 Distrib directory or the Site\MyFiles\REXX directory.

The REXX program may be an example program. XML document 10 attributes may specify one or more of substitute and additional programs to run during any defined event.

XML document 10 may comprise the following elements.

"Name" element may specify the name of the person or group to be notified. This element may be required.

"Tell" element may specify the text of the notification to be sent. This element may be required.

"Ask" element may specify a question and a set of possible answers. An "Ask" element may be optional. When an "Ask" is specified, a notification may not be considered successful until an answer is received from one of the recipients to which the notification has been sent. The "Ask" element contains the following elements.

"EscalateWaitSec" may specify the number of seconds that the notification may wait after all notification methods at a given level are exhausted, before escalating the notification. This may give contacts additional time to respond. If there is a response during the wait period, the notification may be considered successful and escalation may not occur. The "EscalateWaitSec" element may be optional. If not specified, the notification may be escalated as soon as all notification methods at the current level have been attempted.

"Question" may specify the question to be asked of the recipient.

"Choice" may specify a combination of answer and optional action that may be taken if the corresponding answer is selected by the recipient. Up to nine choices may be specified. If no choices are specified, two default choices may automatically be utilized: the first choice may be TRUE and the second choice may be FALSE.

"Answer" element may specify the text representing the answer for this choice. One "Answer" element may be specified for an "Choice" element that is specified.

"Action" element may specify the name of a REXX program to be run if this choice is selected by the recipient. An "Action" element may not be required as part of a "Choice" element. These REXX program names may comprise the associated file extension (.REX or .CMD). The file may be accessible from the server that is issuing the notification. The full path to these REXX files may be omitted if the REXX program resides in either the web service 30 Distrib directory or the Site\MyFiles\REXX directory. Each REXX action program may set a return code on exit. The return code value may be either 0 or any number greater than 9.

"MethTypesToUse" element may specify which types of methods are attempted for a particular notification request. The method type for each method may be defined in a database of a notification manager within the "Method Type" parameter. Before attempting to notify a contact using a particular method, a notification manager may compare the value of that method's type with the value of "MethTypesToUse." If the value of the type parameter is part of the "MethTypesToUse" value, then the notification may be attempted using that method. If the type parameter is not part of the "MethTypesToUse" value, then the notification may not be attempted, and the next scheduled method may be compared to the "MethTypesToUse" value. The value of "MethTypesToUse" may be any string of letters from "A" through "W." The value of "MethTypesToUse" may contain the following values:

A=All method types may be used for all active schedules. No comparisons may be made, and all methods may be attempted.

Any combination of method type parameter values B through W

The "MethTypesToUse" element may be optional. If the "MethTypesToUse" element is not supplied, the value "A" may be used as default.

Consider the following scenario. Assume that all email notification methods within the notification system have a method type indicator of "E", and all pager notification methods have a method type indicator of "P". When "MethTypesToUse" contains the value "A", or the value "EP", or "MethTypesToUse" is not supplied (which defaults to "A"), both email and paging types of methods may be used to perform the notification. If "MethTypesToUse" contains only the value "E", only email notification methods may be used. If "MethTypesToUse" contains only the value "P", only paging notification methods may be used.

"AcknowledgeAP" element may specify that an acknowledgement message is to be sent to the server. "AcknowledgeAP" may be an optional element. The elements of "AcknowledgeAP" may include "Message" element that may specify the acknowledgement text to be sent. "AcknowledgeOPS" element may specify that an acknowledgement message is to be sent to OPS MVS/EMA. This may be an optional element. The elements of "cknowledgeOPS" element may include a "Message" element that may specify the acknowledgement text to be sent, and a "Hostname" element that specify the name of the target host which is currently configured and active.

"AcknowledgeNSM" element may specify that an acknowledgement message to be sent to Network and Systems Management. This may be an optional element. The elements of "AcknowledgeNSM" element may include a "Message" element that may specify the acknowledgement text to be sent and a "Hostname" element that may specify the name of the target host. If it's not specified, all hosts configured within the web service 30 server may receive a copy of the acknowledgement message.

"Attachment" element may specify the name of a file that is to be attached to a notification which is sent by a web service 30 email notification method. The file may be accessible from the server that is issuing the notification. One file name may be specified. The maximum length of the filename (including path) may be 512 characters. An "Attachment" element is optional.

"MethParmOverride" element may specify a method parameter name and parameter value that may override any like-named method parameter during the processing of a notification. For example, if the "SubjectText" ParmName is specified, its associated ParmValue may override the parameter "SubjectText" for any method that uses the "SubjectText" parameter. The "MethParmOverride" element may be optional. The "MethParmOverride" element may be specified multiple times to override multiple method parameters. The "

"MethParmOverride" element may contain "ParmName" element that may specify the name of a method parameter whose value should be overridden and "ParmValue" element that may specify the value to be used for the method parameter.

The HTTP request headers for the POST notifications may comprise an Authorization for supplying a user ID and password in the HTTP Basic Authentication format. The user ID may be a login with the Notify All contacts privilege on the server that is the target of the HTTP method. The HTTP response headers for the OPTIONS notifications may comprise a status indicating Successful result=200=Ok and a Location containing URI to the newly created notification.

At step 240, web service 30 may execute an application that may have been specified in XML document 10. In another embodiment, the web service may execute a predetermined application, using parameters from XML document 10. For example, web service 30 may invoke a send notification command on a notification application using parameters such as message and recipient that may have been retrieved from the XML document. When HTTP requests for the POST notifications are successfully implemented, an XML document of NotificationRequestReply defined in schema NotificaitonRequest.xsd may be the reply document sent back to the requesting computer. The following may be an example of the XML instance representation of NotificationRequestReply:

```
<?xml version="1.0" encoding="utf-8"?>
<NotificationRequestReply
    xmlns="http://www.ca.com/distauto/ap/websvc/msgData"
    xmlns:xsi="http://www.w3.org/2001/XMLSchema-instance"
    xsi:schemaLocation="http://www.ca.com/distauto/ap/websvc/msgData">
    <Notification
        href="http://localhost:8080/apwebsvc/notifications/3735">
        3735
    </Notification>
</NotificationRequestReply>
```

The following may be an example of the schema document 40 corresponding to NotificationRequestReply:

```
<xs:element name="NotificationRequestReply">
    <xs:complexType>
        <xs:sequence>
            <xs:element name="Notification" minOccurs="1"
                maxOccurs="1">
                <xs:complexType>
                    <xs:simpleContent>
                        <xs:extension
                            base=" xs:positiveInteger ">
                            <xs:attribute name="href"
                                type=" xs:anyURI " use="required"/>
                        </xs:extension>
                    </xs:simpleContent>
                </xs:complexType>
            </xs:element>
        </xs:sequence>
    </xs:complexType>
</xs:element>
```

A NotificationRequestReply document may be sent from computer 114 back to a requesting computer in response to the receipt of a "NotificationRequest" document. A "NotificationRequestReply" document may contain an "Notification" element which may contain the numeric ID of the notification that was created by the "NotificationRequest." This may be the same ID used by recipients to identify the notification when they answer a notification. The "Notification" element may contain the "href" attribute which may specify the URI that may be used to access this specific notification in future operations.

The following may be another example of XML document 10:

```
<?xml version="1.0" encoding="utf-8"?>
<NotificationRequest
xmlns:xsi="http://www.w3.org/2001/XMLSchema-instance"
xsi:schemaLocation="http://www.ca.com/distauto/ap/websvc/msgData
NotificationRequest.xsd"
xmlns="http://www.ca.com/distauto/ap/websvc/msgData">
    <Name>PersonThatYouWantToNotifiy</Name>
    <Tell>Hi. This is a notification test.</Tell>
</NotificationRequest>
```

In this example, the XML document may request the above Tell element message be sent to the recipient indicated in the Name element.

Figure 3:
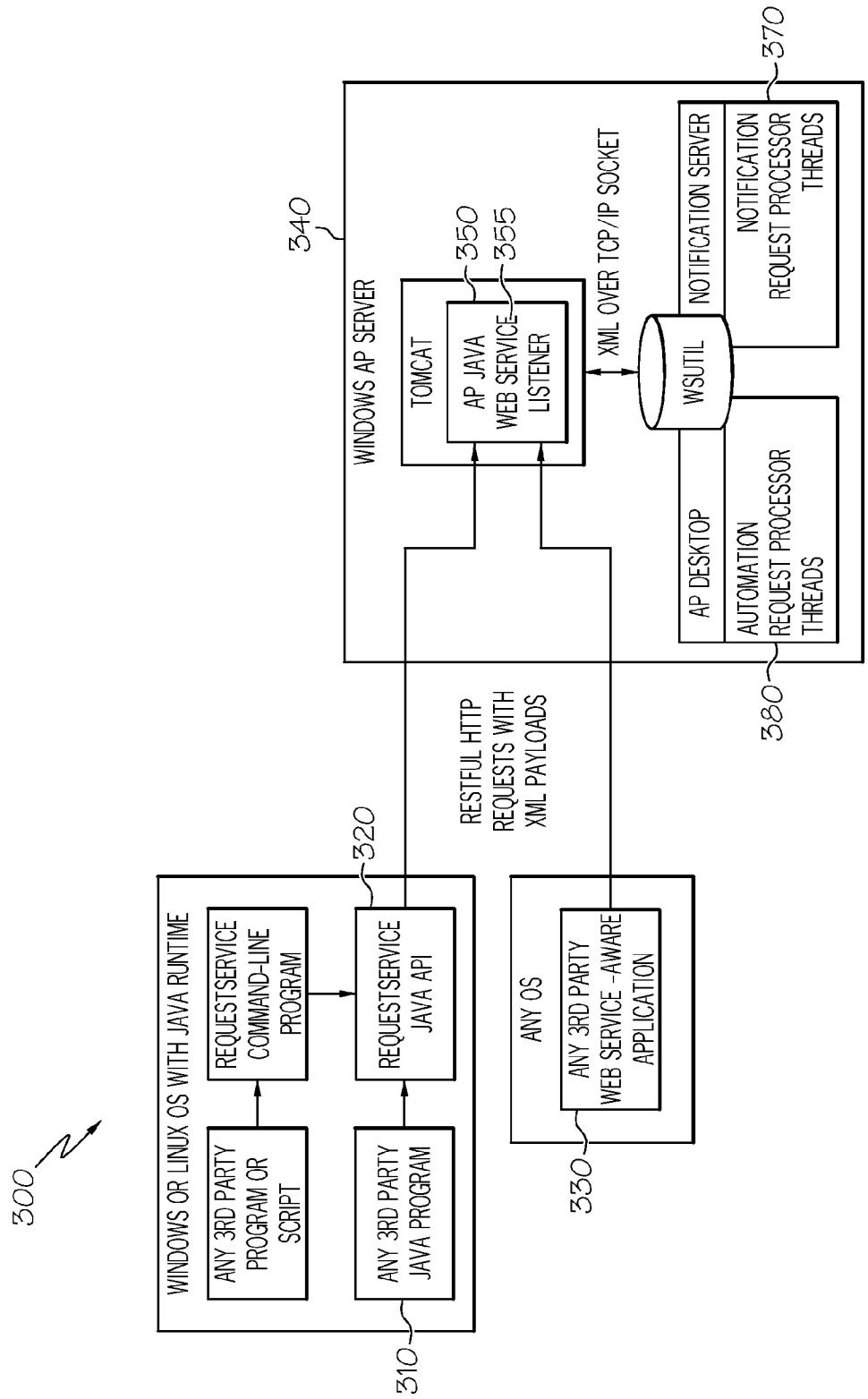
FIG. 3 illustrates a web service architecture diagram in the system for invoking an application command in FIG. 1.

FIG. 3 illustrates a service architecture diagram in the system for invoking an application command in FIG. 1. Service architecture may comprise a server 340 with an application server 350 and a web service 355. Server 340 may further comprise one or more of an automation request processor application and a notification request processor application. The service architecture diagram may further comprise a WINDOWS or LINUX machine 300 running a 3rd party program 310. Machine 300 may have request service API objects 320 running in memory. The service architecture diagram may further comprise any operating system machine 330 with an application configured to consume web services.

The system for invoking an application command may allow one or more of machine 300 or machine 330 to invoke application commands on server 340. For example application 310 may be a JAVA® program configured to call request service API objects 320. Application 310 may want to invoke notification request processor 330, and may store a XML document in machine 300 memory. The XML document may comprise parameters such as the application name, notification message, and information indicating a recipient. Application 310 may call request service API objects 320, passing the XML document and other parameters to the objects. The request service API objects 320 may send an HTTP REST request to server 340. Web service 355 may receive the request, and may invoke command execution on notification request processor 370. In another example, machine 330 may be configured to make the same request without request service API objects 320. Web service 355 may be request agnostic, and may not know system details of machine 330 such as operating system or calling application. Web service 355 may be configured to authenticate any request it may receive.

FIG. 4 illustrates a code block 400 demonstrating how to call the system for invoking an application command in FIG. 1. The code block may be an example of application code in application 310 from FIG. 3. Code block 400 RequestService objects may represent request service API objects 320 in FIG. 3. Code block 400 may be implemented in any programming language, but may contain JAVA® syntax elements for the purpose of presenting a clear example.

Code block 400 may comprise application code line 410 that may create a character string of a XML document. The XML document may have been stored in hard disk previously. Application code line 410 may store the XML document in memory as a text string. The XML document may have XML formatting. Application code block 420 may create an array that may be used to replace instances of "${ContactName}" in the XML document with the name "Gene". Application code block 430 may create a second array that may be used to replace instances of "XXXMessageXXX" in the XML document with "What a great software engineer!" Application code block 440 may instantiate a RequestService object and may make the substitutions in the XML document as described in application code blocks 420 and 430. Application code block 450 may create an object that may represent a reply document. Application code block 460 may send a request. The request may specify the HTTP POST method. The request may be sent to a URI that may resemble the following: "http://YourApHost:8080/apwebsvc/notifications". The request may comprise a user name and password. The request may further comprise the XML document and the empty reply document. Application code block 470 may check the return code and may parse the reply document for status information.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for invoking an application command, the method comprising:
   generating, using a processor, a web service request comprising an extensible markup language (XML) document in the body of the web service request, the XML document comprising information indicating an application command;
   transmitting the web service request to a server using a network communication protocol; and
   wherein the XML document further comprises:
      information indicating a recipient;
      a message;
      an inquiry for the recipient; and
      a response to be selected by the recipient.

2. The method of claim 1, wherein the network communication protocol comprises hypertext transfer protocol (HTTP) or HTTP over SSL/TLS (HTTPS).

3. The method of claim 1, wherein the web service request further comprises:
   a HTTP method;
   a user name; and
   a password.

4. The method of claim 1, further comprising retrieving a web service response comprising an XML document as the body of the response.

5. The method of claim 1, wherein the web service request is generated by calling an application programming interface (API) method with parameters comprising:
   an HTTP method;
   a uniform resource identifier (URI);
   a user name;
   a password;
   the XML document; and
   a reply XML document.

6. A method for invoking an application command, the method comprising:
- generating, using a processor, a web service request;
- transmitting the web service request to a server using a network communication protocol;
- retrieving a web service response comprising an XML document in the body of the response; and
- wherein the web service request is generated by calling an application programming interface (API) method with parameters comprising:
  - an HTTP method;
  - a uniform resource identifier (URI);
  - a user name;
  - a password;
  - the XML document; and
  - a reply XML document.

7. The method of claim 6, wherein the network communication protocol comprises hypertext transfer protocol (HTTP) or HTTP over SSL/TLS (HTTPS).

8. The method of claim 6, wherein the XML document comprises a notification comprising:
- information identifying the notification; and
- a URI of a resource representing attributes of the notification.

9. A computer based system for invoking an application command, the system comprising:
- one or more processors; and
- a memory comprising logic operable to:
  - generate a web service request comprising an XML document in the body of the web service request, the XML document comprising information indicating an application command;
  - transmit the web service request to a server using a network communication protocol; and
- wherein the XML document further comprises;
- information indicating a recipient;
- a message;
- an inquiry for the recipient; and
- a response to be selected by the recipient.

10. The system of claim 9, wherein the network communication protocol comprises hypertext transfer protocol (HTTP) or HTTP over SSL/TLS (HTTPS).

11. The system of claim 9, wherein the web service request further comprises:
- a HTTP method;
- a user name; and
- a password.

12. The system of claim 9, wherein the logic is further operable to retrieve a web service response comprising an XML document as the body of the response.

13. The system of claim 9, wherein the logic is further operable to call an application programming interface (API) method with parameters to generate the web service request, the parameters comprising:
- an HTTP method;
- a uniform resource identifier (URI);
- a user name;
- a password;
- the XML document; and
- a reply XML document.

14. A computer based system for invoking an application command, the system comprising:
- one or more processors; and
- a memory comprising logic operable to:
  - generate a web service request;
  - transmit the web service request to a server using a network communication protocol;
  - retrieve a web service response comprising an XML document as the body of the response; and
  - wherein the web service request is generated by calling an application programming interface (API) method with parameters comprising:
    - an HTTP method;
    - a uniform resource identifier (URI);
    - a user name;
    - a password;
    - the XML document; and
    - a reply XML document.

15. The system of claim 14, wherein the network communication protocol comprises hypertext transfer protocol (HTTP) or HTTP over SSL/TLS (HTTPS).

16. The system of claim 14, wherein the XML document comprises a notification comprising:
- information identifying the notification; and
- a URI of a resource representing attributes of the notification.

* * * * *